Sept. 2, 1930. W. R. ZIMMERMAN 1,774,537
THERMOSTATIC VALVE
Filed May 14, 1927
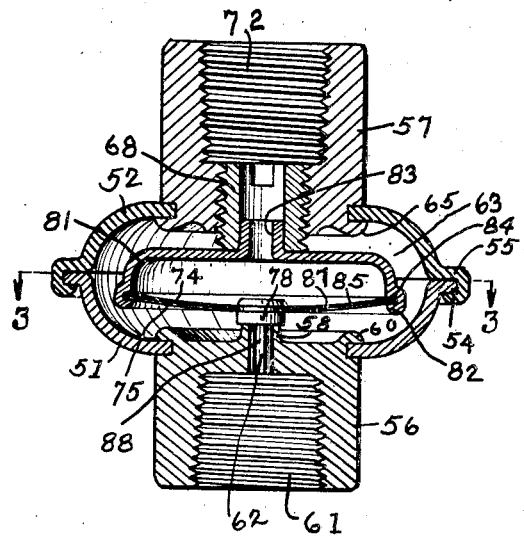
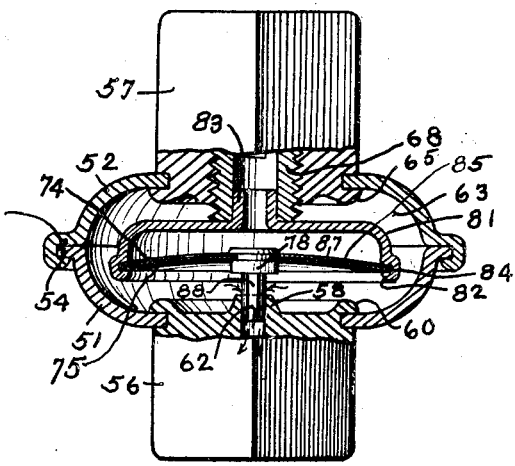
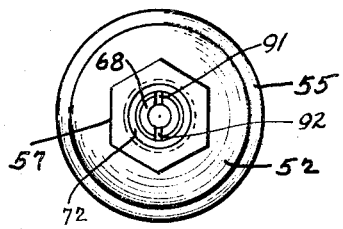
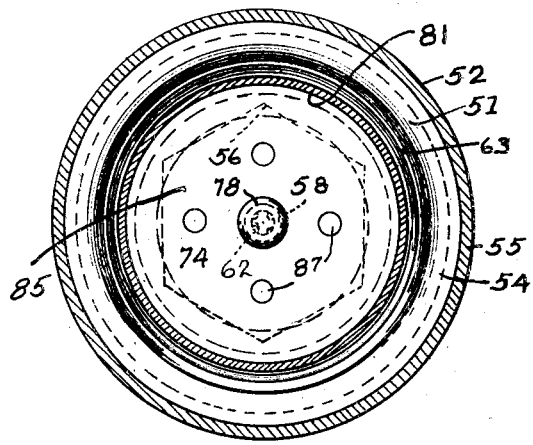
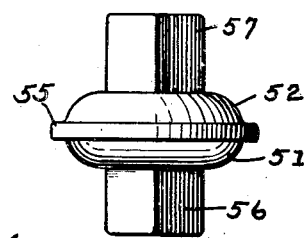
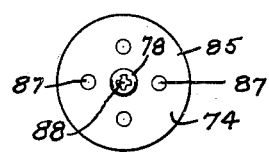
Inventor
William R. Zimmerman
By
Frank M. Slough
His Attorney.

Patented Sept. 2, 1930.

1,774,537

UNITED STATES PATENT OFFICE

WILLIAM R. ZIMMERMAN, OF CLEVELAND, OHIO

THERMOSTATIC VALVE

Application filed May 14, 1927. Serial No. 191,355.

My invention relates to thermostatic valves and relates particularly to thermostatic valves of the type particularly adapted for the accurate control of relatively small fluid flows. In thermostatic valves of the usual types considerable difficulty is had in predetermining the critical values of temperature and fluid pressure under which the valve may operate to increase or decrease a flow of fluid in a conduit to accurately predetermine the values at which the fluid flow will be initiated or discontinued by the actuation of the valve.

My present invention has a particular application for the control of small fluid pressures but is not to be considered as being limited to such use, but even where large fluid flows are to be controlled, I preferably employ a thermostatic valve of the general type disclosed herein operated in a by-pass from the flow to effect operation of a valve in the main flow by the control exercised over the smaller flow in any manner known prior to my present invention.

My invention has a particular application to the accurate control under the influence of temperature variations in a relatively small flow of fluid, such as, for instance, is had in connection with certain types of refrigerating systems, particularly of the so-called absorption types.

An object of my present invention is to provide a thermostatic valve construction capable of controlling a flow through a conduit in an extremely accurate manner.

Another object of my invention is to provide a thermostat for the control of fluid flows which is relatively inexpensive to manufacture and the controlling effects of which under the influence of temperature may be accurately predetermined.

Another object of my invention is to provide apparatus of the character referred to above wherein the operation of the valve relative to the temperature at which the valve is to operate may be adjustably predetermined.

Another object is to provide as a unitary piece of apparatus a thermostatic valve construction of the type above referred to which may be inexpensive to manufacture and which may be installed in a fluid conduit to control in a reliable and accurate manner under the influence of temperature variations the flow therethrough.

Another object of my invention is to provide a thermostatic valve construction, the valve of which will operate positively under concurrent thermo and pressure conditions.

Another object of my invention is to provide a thermostatic valve construction wherein parts may be easily replaced, for instance, for the purpose of varying the responsiveness of the device to vary its temperature and fluid flow controlling characteristics.

The above and other objects of my invention will be better understood by reference to the following description of certain embodiments of my invention and in which reference will be had to the accompanying drawings attached to the specification and in which said embodiments will be illustrated.

In the drawings:

Fig. 1 is a longitudinal medial sectional view of an embodiment of my invention;

Fig. 2 is a view of the said embodiment mostly in section similar to that of Fig. 1 illustrating an alternative operative position of certain of the parts;

Fig. 3 is an elevational view of the embodiment of Figs. 1 and 2;

Fig. 4 is a plan view taken from below of the operative movable parts comprising the thermostatic element and valve elements of Figs. 1 to 3, inclusive;

Fig. 5 is a transverse sectional view of the embodiment of Fig. 1 as taken on the line 3—3 of Fig. 1;

Fig. 6 is a plan view of the said embodiment.

Figs. 3, 4 and 6 are shown as being of the actual size of an embodiment of my invention which I have made and successfully operated, the other figures, Figs. 1, 2 and 5 being enlarged views of the actual device.

Referring now to the embodiment of my invention illustrated in Figs. 1 to 6, inclusive, I provide as illustrated therein a pair of complementary opposed fittings 51 and 52 secured together by their peripheral flanges 54 and 55, respectively, there being secured to their end walls pipe fittings 56 and 57, having their end portions reduced to fit within centrally disposed perforations provided in said cups, and having their ends beaded over, as indicated at 60 and 65, respectively, to make a secure fluid-tight joint between the walls of the cups and the fittings. Both of the fittings have aligned axial bores, each having interiorly threaded enlarged end bore portions 61 and 72, respectively, the bore of each being reduced in the portion projecting through the cup openings.

The fitting 56 is provided at its inner end with a forwardly projecting hollow boss 58, having an axial bore 62 adapted to communicate fluid between the fluid chamber 63 formed by the joined cups and the enlarged threaded bore portion 61 of the fitting, the bore 62 forming a valve orifice terminating in a valve port at its end within the chamber. A hollow screw 68 is adjustably secured, by screw-threaded engagement, with a reduced portion of the bore 72 of the fitting 57 extending within the chamber 63 and carries a cup-shaped valve support 81, having an inturned peripheral rim flange 82 and a centrally disposed hollow stem 83 which is preferably pressed tightly within the screw 68 so as to be movable therewith. A pair of screw driver slots 91 and 92 are provided in the screw 68 for adjustment. An annular groove 84 is provided within the rim of the flange support, and supported within said groove I provide a thermostatic disk 85, of preferably the general form illustrated and described in the patent to Spencer, No. 1,448,240, dated March 13, 1923, except that herein I provide the thermostatic disk, which comprises a pair of metallic disks 74 and 75, with one or more perforations 87, there being preferably a plurality of these perforations provided so disposed with reference to the center of the disk as to accomplish preferably a substantial balance in the amount of material disposed on the different sides of the disk. The disks 74 and 75 are united by their contacting faces, in the manner well-known, whereby a warping of the disk, from a position illustrated in Fig. 1 to a position illustrated in Fig. 2, will be accomplished upon a change of temperature. This change of temperature is effected by the temperature of fluid coming into contact with the disk, and upon the disk being operated to open and close the valve, as the case may be, a fluid flow will be had which will be corrective in its thermal effects upon the thermostatic element to restore the position of the valve.

This action is continuous, the valve operating intermittently to maintain a desired relation of fluid flow and temperature in any usual manner of use employed in connection with thermostatic valves.

The principle set forth in the Spencer patent is herein employed to accomplish a sudden "snap" action of the valve so that the valve is suddenly opened and as suddenly closed upon predetermined variations in temperature of fluid contained within the chamber 63; the responsiveness of the valve may be varied by longitudinal adjustment movements of the adjustment screw 68, pressing the valve disk 78, which is carried at the center of the disk 85, more firmly against the valve seat at the top edge of the tubular projection 58. It will be noted also that a guiding valve stem 88 is herein provided for the disk 78, being rigidly affixed thereto and being substantially star-shaped in transverse sections to maintain the disk in such alignment that good valve closing contact will always be had between the valve disk and the valve seat. The surface area exposed to fluid pressure through the orifice 62 is purposely made so small that little pressure effect will be had on the valve compelling its movement in opposition to the thermal and spring effects more largely relied upon for action of the valve.

Having thus described my invention, I am aware that numerous and extensive departures may be made from the embodiment herein illustrated and described, but without departing from the spirit of my invention.

I claim:

1. In a thermostatic valve, in combination with a fluid conduit casing element, a pair of fluid conduits separately communicating therewith, one of said conduits being provided at its inwardly disposed end with a valve port through which fluid is adapted to be communicated between the said conduit and the casing, a valve for the valve port, a bi-metallic thermostatic element disposed within the casing and supporting said valve, and an element carrier supporting the element by a portion disposed remotely of said valve upon the casing and axially movable connecting means for adjustably connecting said carrier to the casing, whereby said carrier, element, and valve may be bodily adjustably moved axially of said port, both sides of the element being subjected equally to the pressure effect of fluid in the casing to avoid movement of the valve by pressure of fluid in the casing acting upon said element.

2. In a thermostatic valve, in combination with a fluid conduit casing element, a pair of fluid conduits separately communicating therewith, one of said conduits being provided at its inwardly disposed end with a valve port through which fluid is adapted to be communicated between the said conduit and the casing, a valve for the valve port, a bi-metallic thermostatic element disposed within the casing and supporting said valve, and an element carrier supporting the element by a portion disposed remotely of said valve upon the casing and axially movable connecting means for adjustably connecting said carrier to the casing, whereby said carrier, element, and valve may be bodily adjustably moved axially of said port, both sides of the element being subjected equally to the pressure effect of fluid in the casing to avoid movement of the valve by pressure of fluid in the casing acting upon said element, said strip being in the form of a disc, said carrier supporting the disc alone by its peripheral portion, and the disc constantly exerting inwardly directed pressure to constrain it to concavo-convex form, said disc adapted to snap to its two alternative form positions upon thermal effects communicated thereto, and independent of fluid pressure effects.

3. In a thermostatic valve, in combination with a fluid conduit casing element, a pair of fluid conduits separately communicating therewith, one of said conduits being provided at its inwardly disposed end with a valve port through which fluid is adapted to be communicated between the said conduit and the casing, a valve for the valve port, a bi-metallic thermostatic element disposed within the casing and supporting said valve, and an element carrier supporting the element by a portion disposed remotely of said valve upon the casing and screw threaded connecting means for adjustably connecting said carrier to the casing, disposed in axial alignment with said port, whereby said carrier, element, and valve may be bodily adjustably moved axially of said port, said strip presenting both sides equally to the pressure effect of fluid in the casing to avoid movement of the valve by pressure of fluid in the casing acting upon said element, said strip being in the form of a disc having fluid communicating perforations therethrough, said carrier supporting said disc by its periphery, said connecting means being in the form of a bored threaded stem for said carrier, said stem screw threaded into the inwardly disposed portion of the other conduit and communicating fluid between said last named conduit and said casing through said perforated disc.

4. In a thermostatic valve, in combination with a fluid conduit casing element, a pair of fluid conduits separately communicating therewith, one of said conduits being provided at its inwardly disposed end with a valve port through which fluid is adapted to be communicated between the said conduit and the casing, a valve for the valve port, a bi-metallic thermostatic element disposed within the casing and supporting said valve, and an element carrier supporting the element by a portion disposed remotely of said valve upon the casing and axially movable connecting means for adjustably connecting said carrier to the casing, whereby said carrier, element, and valve may be bodily adjustably moved axially of said port, both sides of the element being subjected equally to the pressure effect of fluid in the casing to avoid movement of the valve by pressure of fluid in the casing acting upon said element, and a valve stem secured to said valve, projecting axially into the port passage of said ported conduit, and making contact with the lateral walls thereof to guide said valve to its seat to close the port, said stem being suitably formed to provide fluid conducting passages longitudinally thereof through said passage when the valve is moved from the port opening.

In testimony whereof I hereunto affix my signature this 30th day of April, 1927.

WILLIAM R. ZIMMERMAN.